United States Patent
Filsfils et al.

(10) Patent No.: US 11,424,986 B2
(45) Date of Patent: Aug. 23, 2022

(54) METHOD AND APPARATUS FOR MOBILE PACKET CORE MECHANISM FOR GILAN NETWORK SLICES WITH SEGMENT ROUTING

(71) Applicant: Cisco Technology, Inc., San Jose, CA (US)

(72) Inventors: Clarence Filsfils, Brussels (BE); Francois Clad, Strasbourg (FR); Pablo Camarillo Garvia, Madrid (ES); Ahmed Mohamed Ahmed Abdelsalam, Bolingbrook, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 16/663,186

(22) Filed: Oct. 24, 2019

(65) Prior Publication Data

US 2021/0126831 A1    Apr. 29, 2021

(51) Int. Cl.

| | |
|---|---|
| H04L 1/00 | (2006.01) |
| H04L 41/0893 | (2022.01) |
| H04W 76/12 | (2018.01) |
| H04L 41/0896 | (2022.01) |
| H04L 47/2441 | (2022.01) |
| H04W 28/10 | (2009.01) |

(52) U.S. Cl.
CPC ...... *H04L 41/0893* (2013.01); *H04L 41/0896* (2013.01); *H04L 47/2441* (2013.01); *H04W 28/10* (2013.01); *H04W 76/12* (2018.02)

(58) Field of Classification Search
None
See application file for complete search history.

(56) References Cited

U.S. PATENT DOCUMENTS

| 10,158,568 B2 | 12/2018 | Gage | |
|---|---|---|---|
| 2006/0072595 A1* | 4/2006 | Broberg | H04L 12/4633 370/410 |
| 2017/0332421 A1* | 11/2017 | Sternberg | H04W 84/042 |

(Continued)

FOREIGN PATENT DOCUMENTS

| WO | WO 2018146526 | 8/2018 |
|---|---|---|
| WO | WO 2019005949 | 1/2019 |

OTHER PUBLICATIONS

International Search Report and Written Opinion for International Application No. PCT/US2020/055469, dated Dec. 21, 2020.

(Continued)

*Primary Examiner* — Clemence S Han
(74) *Attorney, Agent, or Firm* — Baker Botts, LLP

(57) ABSTRACT

In one embodiment, a method, by a network apparatus of a first domain network, includes receiving one or more packets from an access network, determining a classification for the packets based on the accounting information, selecting, based on the determined classification, a policy configuration from a plurality of policy configurations for processing the packets, encapsulating the packets with one or more segment identifiers in accordance with the selected policy configuration, and sending the encapsulated packets to a network slice or a second network slice in a second domain network based on the one or more segment identifiers.

20 Claims, 8 Drawing Sheets

(56) References Cited

U.S. PATENT DOCUMENTS

2019/0140863 A1    5/2019  Nainar
2019/0268232 A1*   8/2019  Garcia Azorero .. H04L 47/2408
2019/0349268 A1*  11/2019  Pai ........................ H04M 15/66
2020/0154401 A1*   5/2020  Maguire ............... H04L 41/145

OTHER PUBLICATIONS

Ventre, et al., "Segment Routing: a Comprehensive Survey of Research Activities, Standardization Efforts and Implementation Results," Version 03, Jun. 2019, IEEE Communications Surveys & Tutorials, arXiv.1904.03471v3 [cs.NI] Jul. 11, 2019, 1-29 pages.
Mayer, et al., "An Efficient Linux Kernel Implementation of Service Function Chaining for Legacy VNFs Based on IPV6 Segment Routing," extended version of a submitted paper V02—Jan. 2019, arXiv.1901.00936v2 [cs.NI] Jan. 7, 2019, 1-15 pages.

* cited by examiner

METHOD AND APPARATUS FOR MOBILE PACKET CORE MECHANISM FOR GILAN NETWORK SLICES WITH SEGMENT ROUTING

TECHNICAL FIELD

The present disclosure generally relates to mobile packet core mechanism, and more particular, to processing mobile packets in the core network that are sent with in-band classification information to software defined network slices using segment routing policies.

BACKGROUND

The communications industry is rapidly changing to adjust to emerging technologies and ever-increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based on one or more values representing network nodes or paths.

DESCRIPTION OF EXAMPLE EMBODIMENTS

Overview

Figure 1:
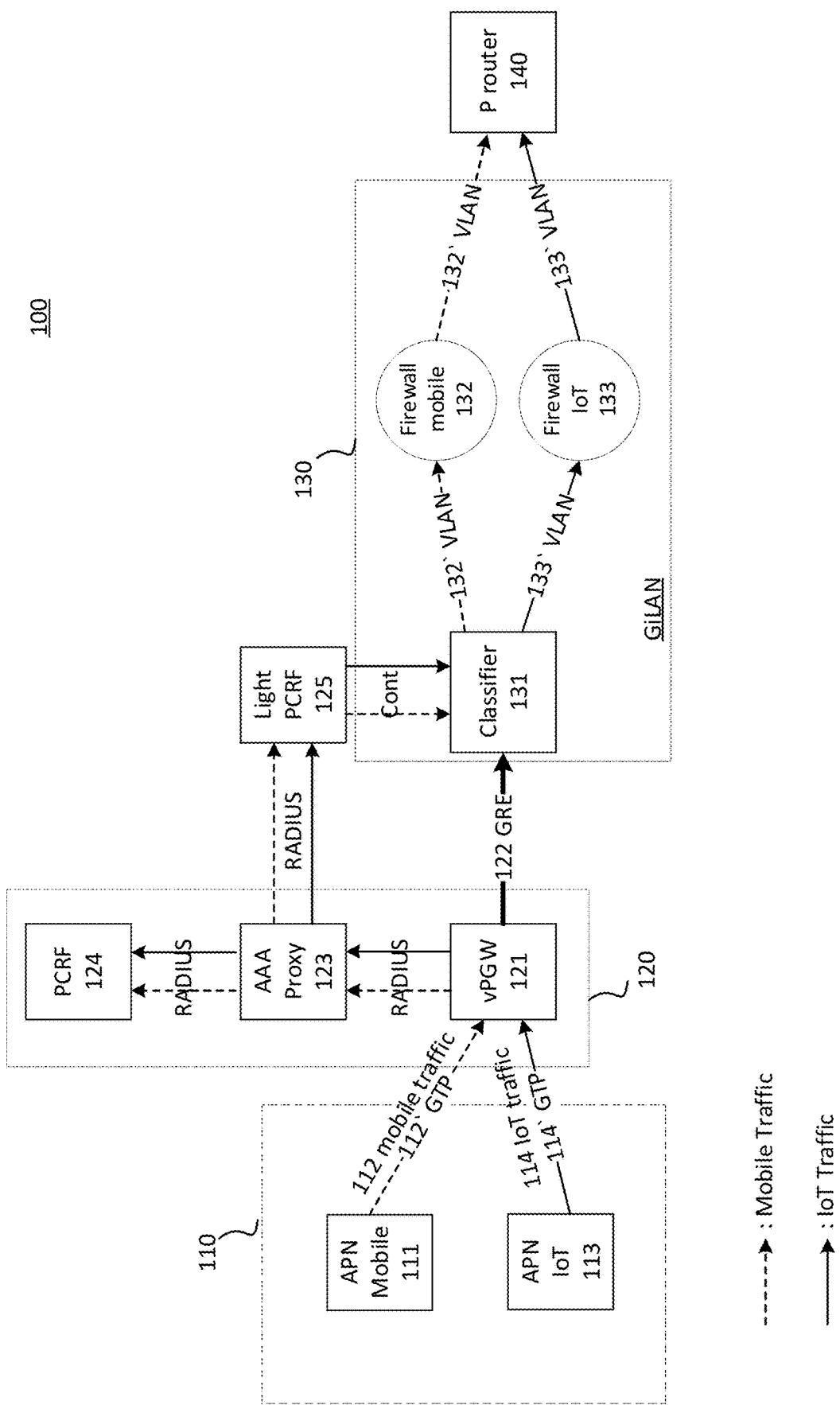
FIG. 1 illustrates an example of a signal flow simplified for mobile traffic and IoT traffic based on a classifier of the GiLAN in a mobile packet network.

In one embodiment, a network apparatus of a core network domain performs mobile packet core mechanism using segment routing (SR) in an in-band manner. The network apparatus may receive one or more packets from an access network, where the packets include accounting information of the packets. The network apparatus may determine a type of traffic for the packets based on the accounting information by classifying whether the packets are originated from a mobile device or machine device. The network apparatus may select a policy configuration from a plurality of policy confirmation for processing the packets based on the classification of the packets. That network apparatus may determine SR policies for the type of traffic for the packets by differently configuring segment identifiers for each traffic type of the packet such that the network apparatus steers the packets to be routed through a network functions of each network slice. The network apparatus may encapsulate the packets with one or more segment identifiers in accordance with the selected policy configuration. The network apparatus may then send the encapsulated packets to a network slice in a second domain network (e.g., GiLAN domain network) based on the one or more segment identifiers.

Example Embodiments

A service provider provides subscribers' devices (e.g., mobile devices of subscribers) and machine devices (e.g., devices used for internet of thing (IoT)) with communication services in a communication network. The service provider operates an access network and a core network, both of which are included in the communication network to serve traffic flows of the mobile devices and/or the machine devices. The access network of the service provider is a type of telecommunication (e.g., GERAN, UTRAN, E-UTRAN, CMMA 2000, GSM, UMTS, WiFi, etc.), which connects subscribers to their immediate service provider via the core network. That is, the access network of the service provider is shared by mobile traffic (i.e., a traffic flow originated by a mobile device used by a user or a subscriber) and IoT traffic (i.e., a traffic flow originated by a machine device). The mobile traffic and the IoT traffic are then connected to the core network through the access network. The access network may use separate sets of antennas respectively dedicated to receiving and transmitting packets related to the mobile traffic and the IoT traffic. The separated sets of antennae are configured to prevent interference therebetween by using separately independent channels and enhancing network function virtualization and quality of service (QoS) for efficient and seamless communication. That is, the service provider assigns each access point naming (APN) to the mobile traffic and the IoT traffic. In other words, the APN may be used to identify if a traffic flow is the mobile traffic or the IoT traffic. The core network, for example virtual evolved packet core (vEPC), may have its common infrastructure including, for example, virtual serving gateway (vSGW) and virtual packet data node gateway (vPGW). The core network may connect to software defined network functions (e.g., software defined network (SDN)), for example, GiLAN, which may deploy at ingress of packet data network (PDN). GiLAN may perform separate sets of functions that are dedicated to either of the mobile traffic and the IoT traffic. GiLAN may perform network service functions (i.e., service function chaining) such as, for example, firewalls, DPI, video optimization, TCP optimization, HTTP header enrichment, NAT, load balancers, caching, etc. That is, GiLAN may support virtualized service functions to make it possible to dynamically configure user plane traffic (e.g., a mobile traffic and IoT traffic in FIGS. 1 and 2) to be routed through a chain of network components which provide value-added service. As an example, traffic of a certain customer (e.g., mobile traffic in FIG. 1) may be passed through a protocol optimization component (e.g., for video) or a security function (e.g., firewall in FIG. 1) such as a parental control.

FIG. 1 illustrates an example of a signal flow simplified for mobile traffic and IoT traffic based on a classifier of the GiLAN in a mobile packet network. FIG. 1 illustrates a simplified block diagram for end-to-end mobile network architecture 100 that comprises access network 110, core network 120, GiLAN 130 and P router 140. The end-to-end mobile network architecture 100 may be represented as several different domains. For one example, GiLAN 130 is a domain to perform service function chaining (SFC) and present a software defined network (SDN). For another example, a packet core may be another domain to represent vSGW (not shown in FIG. 1 for purpose of concise descriptions) and vPGW 121 of the core network 120. A traffic flow (e.g., 112 or 114 in FIG. 1) may originate from a mobile device or a machine device through each APN (e.g., 111 or 113 in FIG. 1).

Referring to FIG. 1, "APN mobile" 111 indicates an APN used for transmitting the mobile traffic 112, and "APN IoT" 113 indicates an APN used for transmitting the IoT traffic 114. The traffic flow may be classified as mobile traffic 112 or IoT traffic 113 according to which device the traffic flow originates from. Each traffic flow (the mobile traffic and IoT traffic) is transmitted from each APN to vPGW 121 of a core network 120 through the access network 110. Each traffic flow may include information of APN, and the information of APN is used to identify whether the traffic flow is originated from a mobile device or a machine device (i.e., IoT). Each traffic flow from APN mobile 111 or APN IoT 113 is transmitted to vPGW 121 via each GTP tunnel, established between access network 110 and core network 120, according to a type (or characteristic) of the traffic flow. The GTP tunnels are initiated by the packet core and used in the packet core for delivering traffic (i.e., IP packets) between one entity (e.g., APN) and the other (e.g., vPGW 121). A packet transmitted via GTP tunnel may be denoted as a GTP packet. Each GTP packet may include a Tunnel Endpoint Identifier (TED) that identifies a particular GTP session. A GTP Session is a single session established between a user endpoint (e.g., a mobile device or an IoT device) and the packet core. That is, mobile traffic 112 is transmitted to vPGW 121 of core network 120 via GTP tunnel 112'. The IoT traffic 113 is transmitted to vPGW 121 of core network 120 via GTP tunnel 114'. When the vPGW 121 receives each traffic flow (e.g., the mobile flow 112 and the IoT flow 114), vPGW 121 may steer all the traffic flows into a Generic Routing Encapsulation (GRE) tunnel to classifier 131 at an ingress of GiLAN 130. In other words, vPGW 121 may know which packet belongs to the mobile traffic 112 or the IoT traffic 114. However, when the GTP tunnel 112' or 114' is finished at vPGW 121, information related to whether a type of the received traffic flow is mobile flow 112 or IoT flow 114 is lost. When vPGW 121 receives the GTP packet and the GTP tunnel 112' or 114' is terminated at vPGW 121, vPGW 121 may establish the GRE tunnel 122 to send IP packets originated from the mobile device or the machine device (i.e., IoT device). The GRE tunnel 122 is a single tunnel commonly used for both the mobile traffic 112 and the IoT traffic 114 such that the GRE tunnel 112 is established to deliver the IP packets from the core network 120 to GiLAN 130 and is not used to deliver the information about the type of the IP packets. That is, the information related to whether a type of the received traffic flow is mobile flow 112 or IoT flow 114 is not sent by vPGW 121 through the GRE tunnel 122. vPGW 121 may just perform functions for encapsulating IP packets, which are related to the traffic flow, in order to route the encapsulated IP packets to be sent from one network to another network. In view of GiLAN domain, GiLAN 130 is not able to identify if the IP packets themselves, received through the GRE tunnel, are a type of the mobile traffic 112 or the IoT traffic 114. GiLAN 130 therefore needs a classifier 131 to classify that the IP packets come from the mobile traffic or the IoT traffic.

Further, when vPGW 121 receives the GTP packet, vPGW 121 may identify whether the IP packet comes from APN mobile 111 or APN IoT 113 based on the GTP TED included in the GTP packet. vPGW 121 may send, to police and charging rules function (PCRF) 124, accounting information of each traffic flow through authentication, authorization and accounting (AAA) proxy 123 via RADIUS protocol. Herein the accounting information may include information related to a specific device (e.g., the mobile device or the machine device) and IP characteristics of the IP packet (e.g., source IP, destination IP, ports, etc.). AAA proxy 123 may receive the accounting information of each traffic flow and forward it to PCRF 124. AAA proxy 123 may further duplicate the accounting information and forward the duplicated accounting information to Light PCRF 125. Light PCRF 125 may leverage the accounting information to configure rules on classifier 131 of GiLAN 130. In view of GiLAN domain, classifier 131 of GiLAN 130 may receive the IP packet of all the traffic flow from vPGW 121 in an in-band manner, i.e., via GRE tunnel 122, and receive the accounting information of each traffic flow from Light PCRF 125 in an out-of-band manner. As used herein, in-band may indicate a channel (or session) directly established between vPGW 221 of the core network and GiLAN130. Out-of-band may indicate another channel (or session) additionally established between another network entity (e.g., Light PCRF 125) of the core network and GiLAN130. That is, in out-of-band manner, establishing another session is required to receive the accounting information beside in-band session directly established between vPGW 221 and GiLAN 130.

Classifier 131 may identify whether the IP packet, which is received from vPGW 121 in the in-band manner, is mobile traffic or IoT traffic using the account information received from Light PCRF 125 in the out-of-band manner. Classifier 131 may steer each traffic flow (i.e., the mobile traffic or the IoT traffic) to be routed through a chain of network components. In FIG. 1, firewall functions 132 and 133 are only presented as an example and for purpose of concise descriptions. The number of network components (or network functions) in GiLAN 130 is not limited to firewall functions 132 and 133 and may be scalable and configured as many as the network's operation and policy. When classifier 131 receives the accounting information of the mobile traffic flow from Light PCRF 125, classifier 131 may identify which network slice is used for routing the IP packet, received via the GRE tunnel 122, to network functions in GiLAN 130. In FIG. 1, the network slice may indicate, for example, VLAN 132' for firewall mobile 132 and VLAN 133' for firewall IoT 133. That is, classifier 131 may classify if a type of the IP packet is mobile traffic or IoT traffic using the accounting information received from Light PCRF 125. When the type of the IP packet is determined to be classified as mobile traffic, classifier 131 may steer (or forward) the IP packet into P router 140 of another network (i.e., a destination network) through a first route that comprises firewall mobile 132 of a first network slice via VLAN 132'. Herein, the first route may be configured to be dedicated to delivering the mobile traffic. When the type of the IP packet is determined to be classified as the IoT traffic, classifier 131 may steer (or forward) the IP packet into P router 140 through a second route that comprises firewall IoT 133 of a second network slice via VLAN 133'. Herein, the second route may be configured to be dedicated to delivering the IoT traffic.

In one embodiment presented in FIG. 1, vPGW 121 may identify whether the traffic comes from a mobile traffic or IoT traffic using TED. However, when vPGW 121 terminates the GTP tunnels 112' and 114', the information about the APN is lost and is not available at classifier 131. When the IP packet sent from vPGW 121 arrives at GiLAN 130, GiLAN 130 cannot use the information of the APN anymore. GiLAN 130 may then need to build a complex, non-scalable setup that requires hacks and also reclassify the traffic to be able to retrieve the information about a type of each traffic flow. Further, in the embodiment presented in FIG. 1, classifier 131 cannot obtain the information about a type of the traffic flow in the in-band manner. Classifier 131 is required to establish another session to receive the information about a type of the traffic flow in the out-of-band manner with which AAA proxy 123 and Light PCRF 125 are associated. In other words, FIG. 1 requires network entities, i.e., AAA proxy 123, Light PCRF 125 and classifier 131, such that GiLAN 130 can perform network service functions for network slices that are assigned to each traffic flow (i.e., the mobile traffic or the IoT traffic) and steer the mobile traffic or the IoT traffic to predetermined network service functions. The particular embodiments of the present disclosure provide technical solutions to send the information about a type of the traffic in such an in-band manner that a core network domain (e.g., vPGW 121) directly sends the information about a type of the traffic to GiLAN domain. In the in-band manner, the core network domain may encapsulate the IP packet with the information about a type of the traffic using a segment routing protocol (e.g., SRv6).

As used herein, Segment Routing (SR) allows a network node to steer a packet through a controlled set of instructions, called segments, by prepending an SR header to the packet. A segment can represent any instruction, topological or service-based. SR allows a network to enforce a flow through any path (topological or service/application based) while maintaining per-flow state only at the ingress node to the SR domain. Segments can be derived from different components: IGP, BGP, Services, Contexts, Locators, etc. The list of segments forming the path is called the Segment List and is encoded in the packet header. SR allows the use of strict and loose source-based routing paradigms without requiring any additional signaling protocols in the infrastructure, hence delivering excellent scalability properties.

As used herein Segment Routing includes using Internet Protocol version 6 (IPv6) addresses as Segment Identifiers (SIDs). In other words, as used herein, Segment Routing includes IPv6 Segment Routing (SRv6). As used herein, a Segment Routing node refers to a network node (e.g., router, server, appliance) that performs Segment Routing functionality, including, but not limited to, adding, updating, or removing a Segment Routing Header. The SR node performs a Segment Routing function identified by a Segment Identifier that is the IP Destination Address of an IP packet or is a Segment Identifier in a Segment Routing Header (SRH). Also, as used herein, an IP packet may or may not be a Segment Routing Packet; but a Segment Routing packet is an IP packet.

The term "SID" stands for a segment identifier, which represents a specific segment in a segment routing domain. The SID type used in this document is, for example, IPv6 address (e.g., also referenced as SRv6 Segment or SRv6 SID). A SID list is represented as <S1, S2, S3> where S1 is the first SID to visit, S2 is the second SID to visit and S3 is the last SID to visit along the SR path.

The term, "GPRS Tunneling Protocol (GTP)" is a group of IP-based communications protocols used to carry general packet radio service (GPRS) within, for example, GSM, UMTS and LTE networks. In 3GPP architectures, GTP and proxy mobile IPv6 based interfaces are specified on various interface points. The term "Generic Routing Encapsulation (GRE)", defined by RFC 2784, is a simple IP packet encapsulation protocol. A GRE tunnel is used when IP packets need to be sent from one network to another, without being parsed or treated like IP packets by any intervening routers. The term "flow" or "traffic flow" indicates a "packet flow," i.e., a sequence of packets from a source to a certain destination (e.g., it can be a unicast, multicast or broadcast destination, if the network protocol supports it) at a certain point in time. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 2:
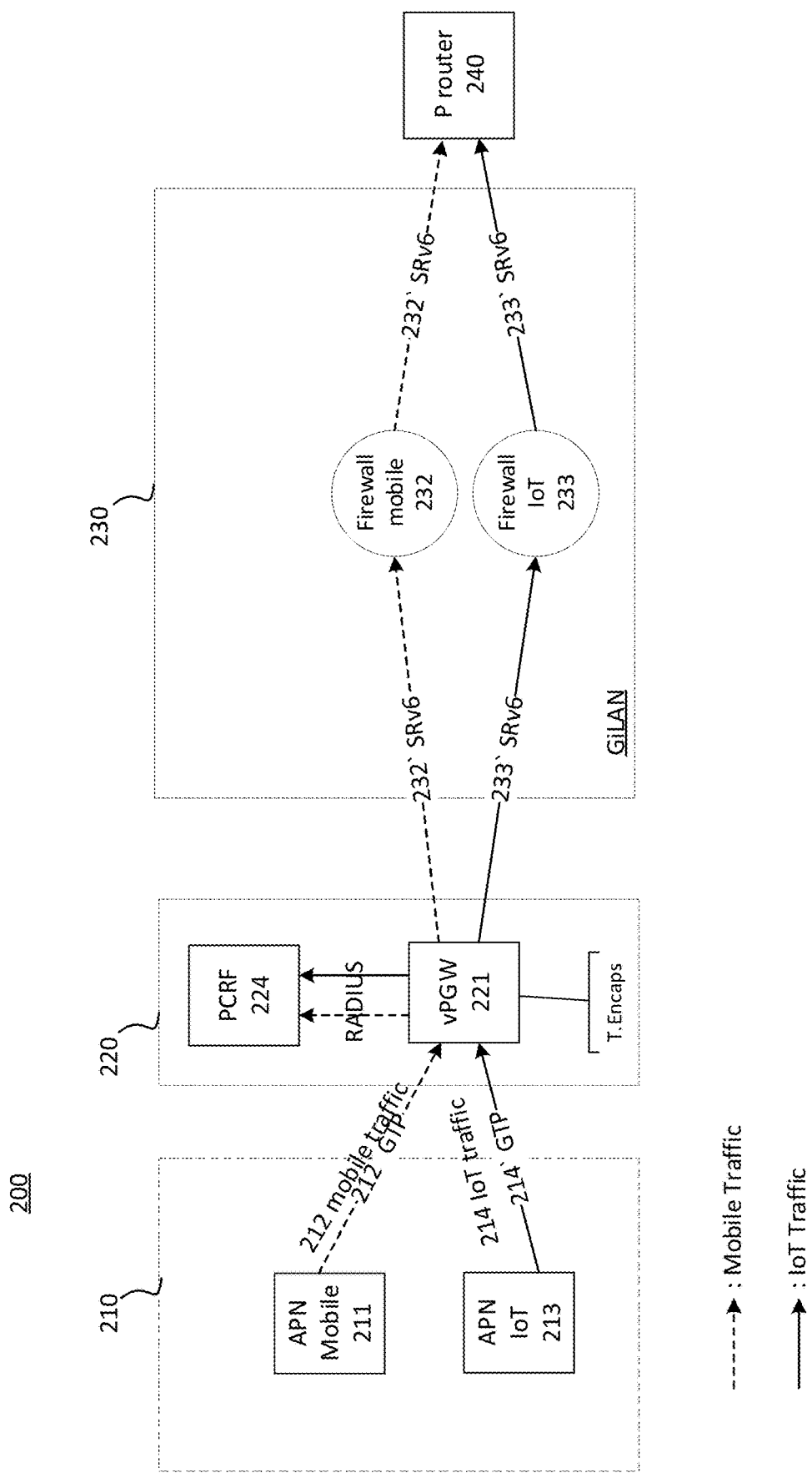
FIG. 2 illustrates an example of a signal flow simplified for mobile traffic and IoT traffic using SRv6 in a mobile packet network.

FIG. 2 illustrates an example of a signal flow simplified for mobile traffic and IoT traffic using SRv6 in a mobile packet network. FIG. 2 illustrates a simplified block diagram for end-to-end mobile network architecture 200 that comprises access network 210, core network 220, GiLAN 230 and P router 240. The end-to-end mobile network architecture 200 may be represented as several different domains. For one example, GiLAN 230 is a domain to perform service function chaining (SFC) and present a software defined network (SDN). For another example, a packet core may be another domain that represents vSGW (not shown in FIG. 2 for purpose of concise descriptions) and vPGW 221 of the core network 220. A traffic flow (i.e., 212 or 214 in FIG. 2) may be originated from a mobile device or a machine device through each APN (i.e., 211 or 213 in FIG. 2). The example embodiment in FIG. 2 may leverage SRv6 to ensure that vPGW 221 steers the traffic (e.g., a sequence of packets for the mobile traffic or the IoT traffic) into the GiLAN 230 network slice.

FIG. 2 provides an embodiment where vPGW 221 directly steers the traffic from the access network 210 into the network slices GiLAN 230 by using a configuration of two SRv6 policies (P1 and P2). vPGW 221 may configure two different SRv6 policies for the mobile traffic and the IoT traffic. The SRv6 policies vPGW 221 may include one or more segment identifiers which indicate service network functions through which the mobile traffic and the IoT traffic are routed within GiLAN domain. Herein SRv6 segment indicates an IPv6 address. vPGW 221 may configure policy P1 for the mobile traffic flow and policy P2 for an IoT traffic flow. That is, P1 policy may be configured when a traffic flow comes from the mobile traffic. P2 policy is configured when a traffic flow comes from the IoT traffic. Policy P1 may be configured with a list of segment identifiers (e.g., SID-list <F_mobile, P>) of SRv6 segments. Referring to FIG. 2, vPGW 211 may configure P1 with SID-list <F_mobile, P> to route the IP packet through firewall mobile 232 and P router 240. SID-list <F_mobile, P> of P1 may indicate two segment identifiers (SIDs) of "F_mobile" and "P" where "F_mobile" SID indicates an IPv6 address of firewall 232 and "P" SID indicates an IPv6 address of P router 240. vPGW 211 may configure P2 with SID-list <F_IoT, P> to route the IP packet through firewall IoT 233 and P router 240. SID-list IoT, P> of P2 may indicate two segment identifiers of "F_IoT" and "P" where "F_IoT" SID indicates an IPv6 address of firewall 233 and "P" SID indicates an IPv6 address of P router 240. SID-list in FIG. 2 presents two segment identifiers for purpose of concise descriptions only; a skilled practitioner should appreciate that any number of segment identifiers may be used as needed. The number of segment identifiers is not limited to firewall functions 232 and 233 but may be scalable and configured as many as needed.

Referring to FIG. 2, when vPGW 221 receives IP packet (i.e., GTP packet) via GTP tunnel 212' or 214', vPGW 221 may identify whether the IP packet comes from APN mobile 211 or APN IoT 213 based on GTP TED included in the GTP packet. vPGW 221 may send, to police and charging rules function (PCRF) 224, accounting information of each traffic flow via RADIUS protocol. Herein the accounting information may include information related to a specific device (e.g., the mobile device or the machine device) and IP characteristics of the IP packet (e.g., source IP, destination IP, ports, etc.). Depending on whether vPGW 221 identifies the IP packet (i.e., GTP packet) as being mobile traffic 212 or IoT traffic 214, vPGW 221 may configure P1 for the mobile traffic 212 or P2 for the IoT traffic 214 using the accounting information of the traffic flow.

Figure 3:
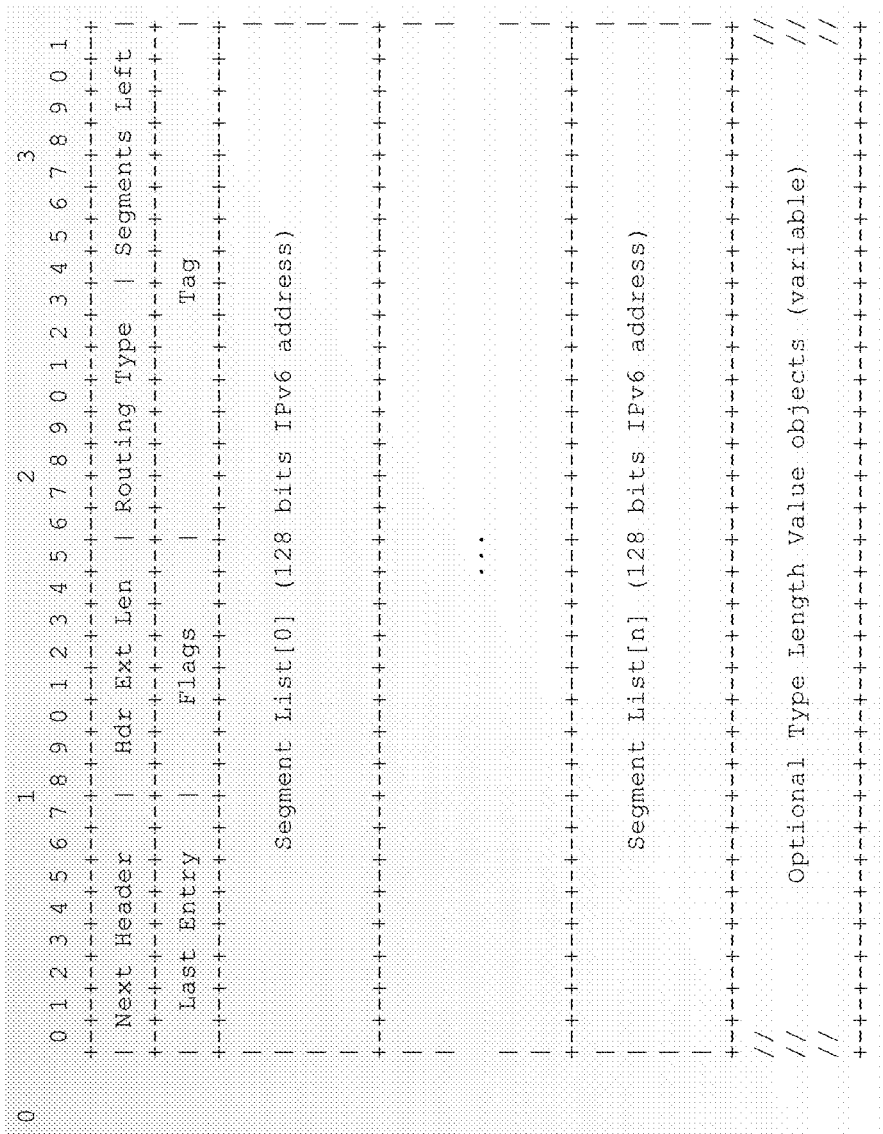
FIG. 3 illustrates an example of segment routing extension header (SRH).

FIG. 3 illustrates an example of segment routing extension header (SRH). vPGW 221 may encapsulate the IP packet with SID-list of P1 or P2 into SRH. That is, SRH has all the SRv6 segments corresponding to P1's SID-list or P2's SID-list and encodes the segments in a SID list section. In particular embodiments, each SRv6 segment is associated with a single function (e.g., End.AN and End.D' in FIG. 2). When a router (e.g., P router 240) or a service network function (e.g., firewalls 232 and 233) receives the IP packet with a particular SRv6 segment included in the SID-list of P1 or P2, the router or a service network function decapsulates the IP packet, identifies the corresponding function of each SRv6 segment, and executes instructions associated to the function. This function may be related to decapsulating the IP packet, doing a lookup in a particular virtual network function, forcing the IP packet to cross a specific link, or performing any other suitable function. In one embodiment, when vPGW 221 produces a SRv6 packet by encapsulating the IP packet with SRv6 segments, vPGW 221 may also produce metadata for the SRv6 packet and include the metadata in the SRv6 packet. The metadata may include the device's location (e.g., mobile device's location and machine device's location), PCRF policy information, link quality or 5GS slice so that the GiLAN 230 can leverage this information for packet processing.

Figure 4:
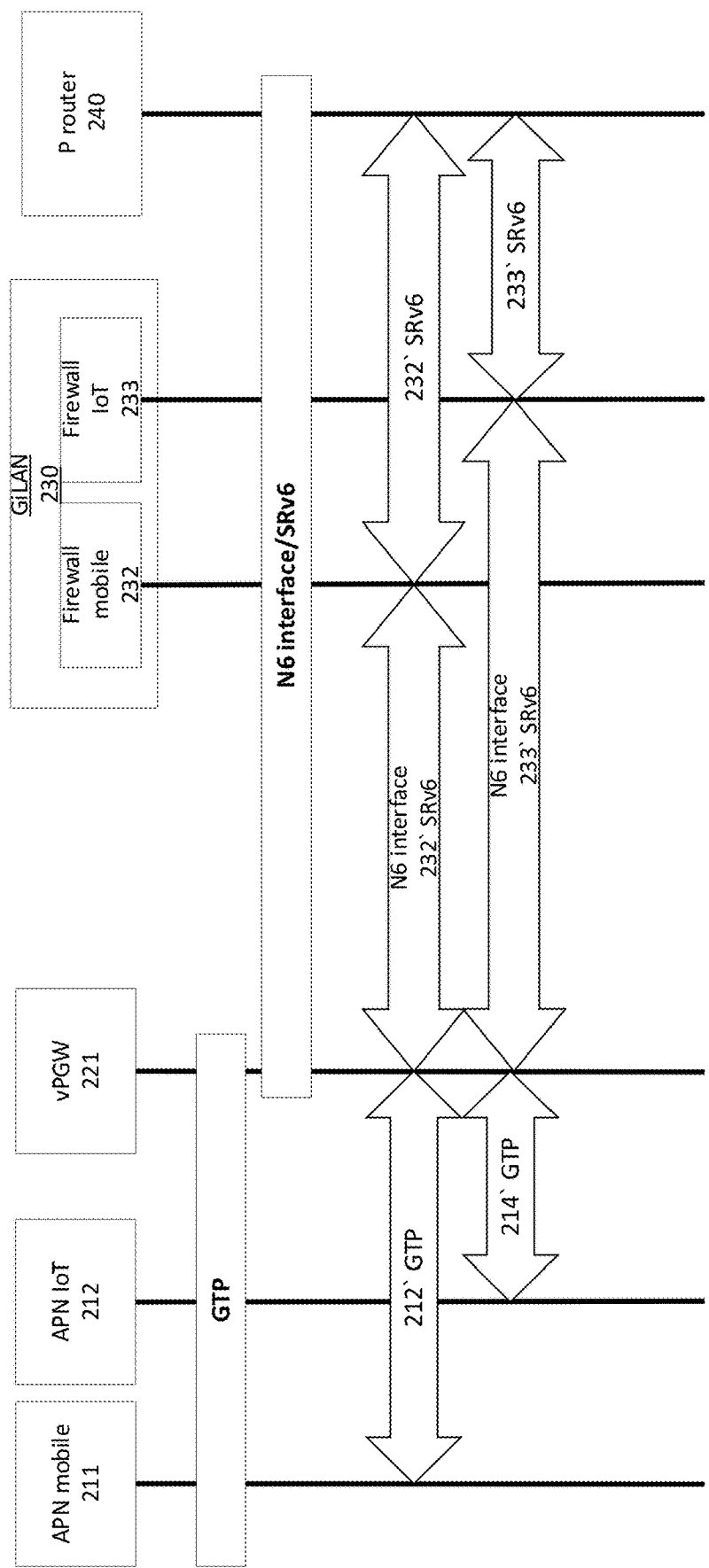
FIG. 4 an example of a simplified interface protocol using SRv6 in a mobile packet network.

FIG. 4 illustrates an example of a simplified interface protocol using SRv6 in a mobile packet network. In one embodiment, since vPGW 221 may generate SR policies P1 and P2 using the accounting information of the mobile traffic 212 and the IoT traffic 214, vPGW 221 may have capability of visibility over active virtual network functions (VNFs) in GiLAN. Referring to FIGS. 2 and 4, when vPGW 221 identifies that the IP packet, received from access network 210, is a type of the mobile traffic 212, vPGW 221 may generate P1 policy and forward the IP packet to a virtual network function, i.e., firewall mobile 232 via N6 interface. The IP packet is steered to be routed to P router 240 through firewall mobile 232, based on the generated P1 policy with SID-list <F_mobile, P>. When vPGW 221 identifies that the IP packet, received from access network 210, is a type of the IoT traffic 214, vPGW 221 may generate P2 policy and forward the IP packet to a virtual network function, i.e., firewall IoT 233 via N6 interface. The IP packet is steered be routed to P router 240 through firewall mobile 233, based on the generated P2 policy with SID-list <F_IoT, P>. Herein firewall appliances 232 and 233 may be either SR-aware or accessed via an SRv6 proxy. When P router 240 receives the IP packet from firewall 232 or 233 according to P1 or P2 policy, P router 240 may decapsulate the IP packet and forward as appropriated. Both P1 and P2 policies may terminate on P router 240, which is a destination of P1 and P2. In one embodiment of FIG. 2, since vPGW 221 may be directly involved with producing or encapsulating information for a type of the traffic flows by including such information in the SRv6 encapsulation, the IP packet forwarded from vPGW 221 and GiLAN 230 may be self-descriptive. That is, vPGW 221 may send the information about a type of the traffic flows with the IP packet itself in an in-band manner, and GiLAN 230 does not use classifier 131 in FIG. 1 which needs to reclassify a type of the traffic flows based on the information received from Light PCRF 124 in an out-of-band manner.

Figure 5:
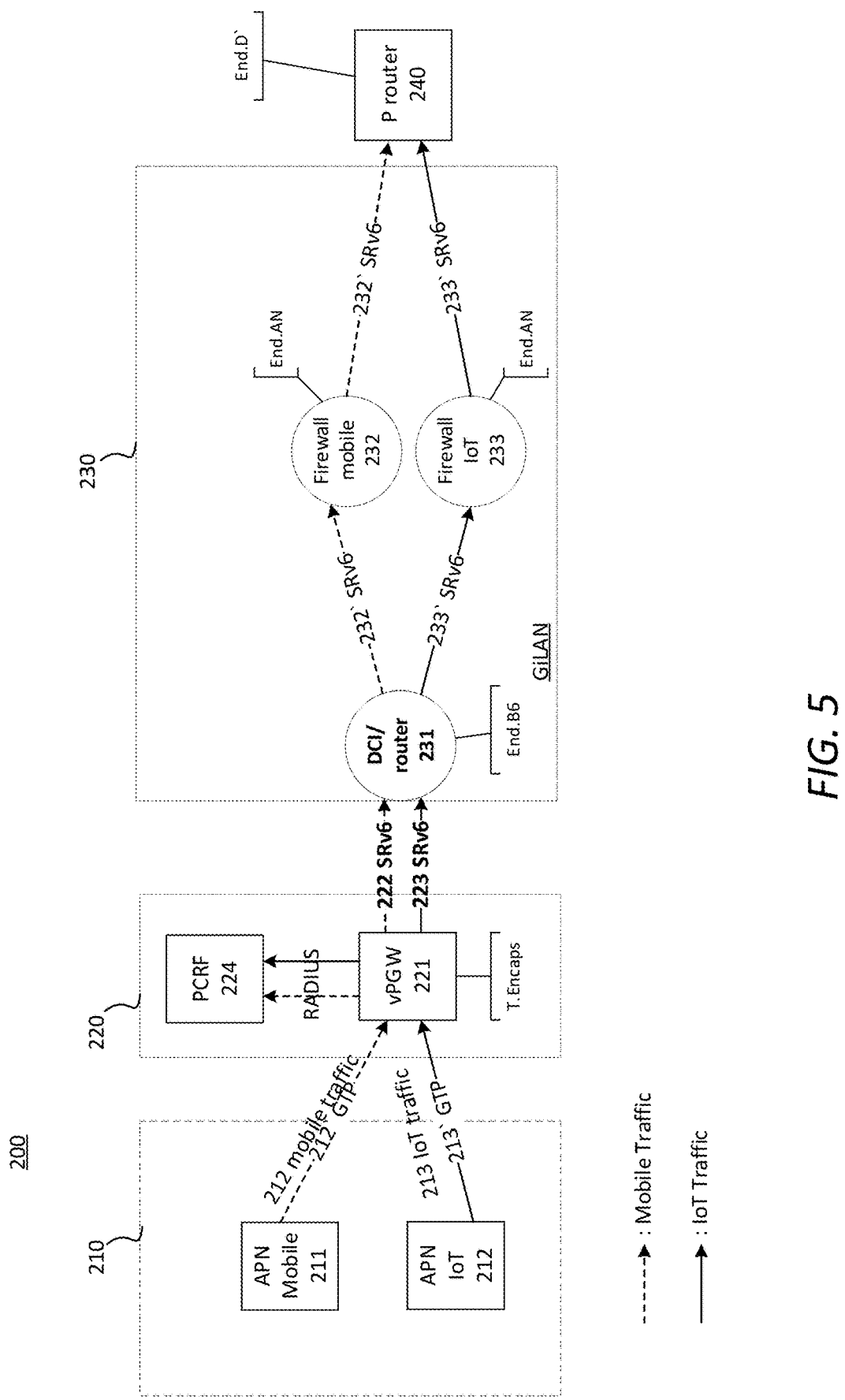
FIG. 5 illustrates another example of a signal flow simplified for mobile traffic and IoT traffic using SRv6 in a mobile packet network.
Figure 6:
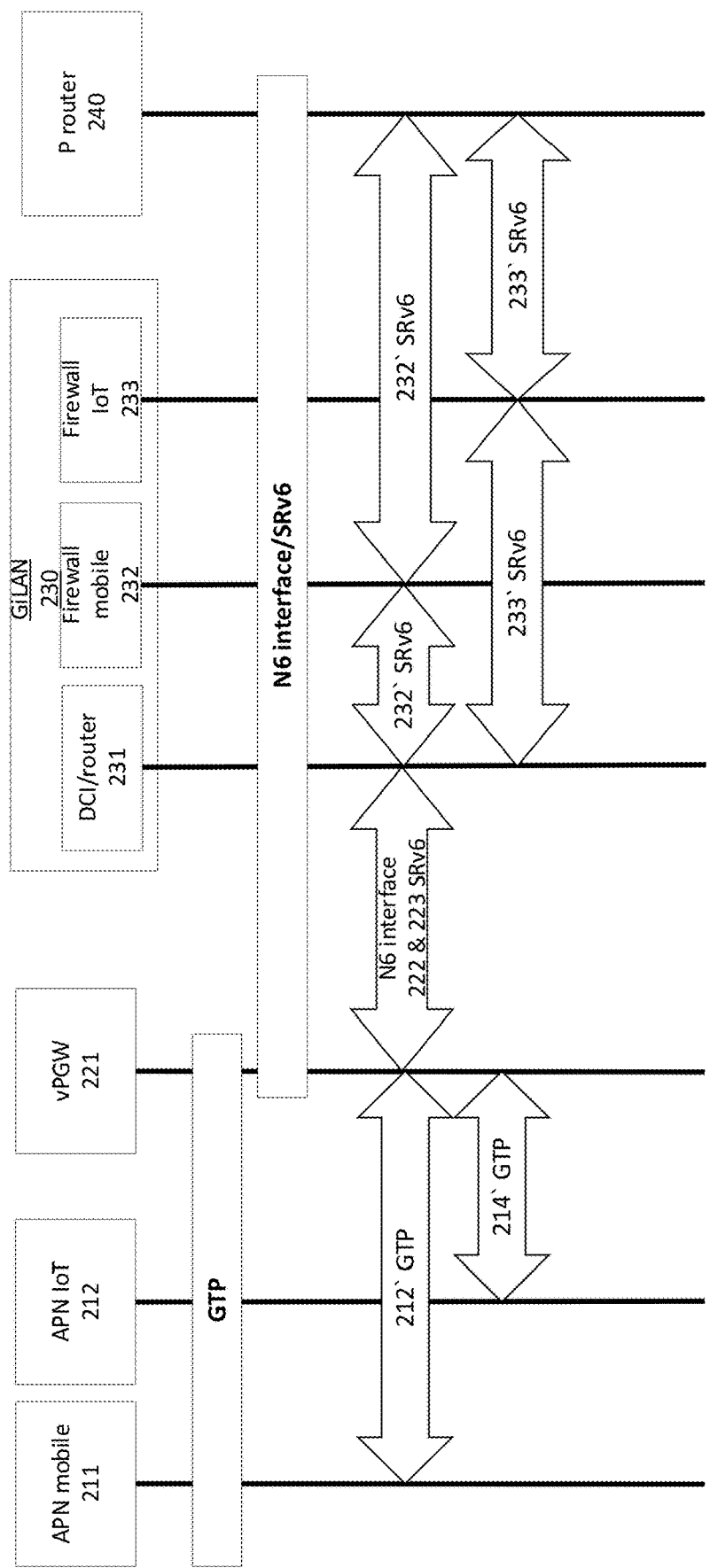
FIG. 6 illustrates another example of a simplified interface protocol using SRv6 in a mobile packet network.

FIG. 5 illustrates another example of a signal flow simplified for mobile traffic and IoT traffic using SRv6 in a mobile packet network. FIG. 6 illustrates another example of a simplified interface protocol using SRv6 in a mobile packet network. FIG. 5 provide mobile packet core mechanism for GiLAN 230 by using binding segment identifiers (BSIDs) and data center interconnect (DCI) router 231. In FIG. 5, vPGW 221 does not have capability of visibility over active virtual network functions (VNFs) in the GiLAN 230, and DCI router 231 may expand each BSID into SR policy. That is, GiLAN domain may steer the IP packet to be routed into actual VNFs by producing or updating segment identifiers for each traffic flow. Descriptions related to access network 210 and core network domain in FIG. 2 are commonly applicable to FIG. 5, and therefore incorporated herein to corresponding descriptions to FIG. 5. Details descriptions are disclosed hereinafter.

Referring to FIGS. 5 and 6, when vPGW 221 receive IP packet (i.e., GTP packet) via GTP tunnel 212' or 214', vPGW 221 may identify whether the IP packet comes from APN mobile 211 or APN IoT 213 based on GTP TED included in the GTP packet. vPGW 221 may send, to PCRF 224, accounting information of each traffic flow via RADIUS protocol. The accounting information may include information related to a specific device (e.g., the mobile device or the machine device) and IP characteristics of the IP packet (e.g., source IP, destination IP, ports, etc.). When vPGW 221 identifies if the IP packet (i.e., GTP packet) is a type of the mobile traffic 212 or the IoT traffic 214, vPGW 221 may configure P1 and P2 policies using binding SID (BSID). Herein P1 policy is generated with SID-list <BSID_mobile, P> for the mobile traffic 212 and P2 is generated SID-list with <BSID_IoT, P> for the IoT traffic 214 using the accounting information of each traffic flow. vPGW 221 may encapsulate the IP packet with SID-list of P1 or P2 into segment routing extension header (SRH). In particular, vPGW 221 may generate P1 and P2 policies using BSID. That is, BSID is added in each SID-list of P1 and P2. BSID is a type of an SRv6 segment. vPGW 221 may associate BSID to segment identifiers list (i.e., SID-list). For one example, vPGW 221 may generate P1 policy with BSID where BSID is associated (or binding) with virtual network functions of firewall mobile 232 and P router 240. For another example, vPGW 221 may generate P2 policy with BSID where BSID is associated (or binding) with virtual network functions of firewall IoT 233 and P router 240.

The SRH imposed at vPGW 221 contains a SID for P router 240 included in the DCI router 231 may push each SID-list that steers the IP packet through a required sequence of service functions or VNFs: <F_mobile> or <F_IoT> where <F_mobile> is associated with "BSID_mobile" and <F_IoT> is associated with "BSID_IoT." DCI router 231 firstly reads an active segment in SID-list and then decides an action to be performed on the IP packet based on the active segment and DCI router's own configuration. For example, the action performed by DCI router 231 may be to: (1) modify a current encapsulation of the IP packet; (2) add another encapsulation on top of existing encapsulation of the IP packet; or (3) remove the current encapsulation and process an inner payload of the IP packet; or any combinations of (1), (2) and (3). When vPGW 221 identifies that the IP packet, received from access network 210, is a type of the mobile traffic 212, vPGW 221 may generate P1 policy with SID-list <BSID_mobile, P> and forward the IP packet to DCI router 231 of GiLAN domain via N6 interface (see 222 SRv6 in FIG. 5). DCI router 231 may inspect the IP packet, forwarded from vPGW 221, and then identify BSID included in P1 policy. DCI router 231 may process a first SID, "BSID_mobile" such that a new "<F_mobile>" associated to "BSID_mobile" is written in the IP packet on top of the SRH as in a separate SRH. This operation effectively pauses an original SID-list (e.g., <BSD mobile, P>) and a new SID-list (e.g., <F_mobile>) starts being processed. DCI router 231 may steer the IP packet to be routed into P router 240 through firewall mobile 232 (see 232' SRv6 in FIG. 5). In another embodiment, when vPGW 221 identifies that the IP packet, received from access network 210, is a type of IoT traffic 212, vPGW 221 may generate P2 policy with SID-list <BSID_IoT, P> and forward the IP packet to DCI router 231 of GiLAN domain via N6 interface (see 223 SRv6 in FIG. 5). DCI router 231 may inspect the IP packet, forwarded from vPGW 221, and then identify BSID included in P2 policy. DCI router 231 may process a first SID, "BSID_IoT" such that a new "<F_IoT>" associated to "BSID_IoT" is written in the IP packet on top of the SRH as in a separate SRH. This operation effectively pauses an original SID-list (e.g., <BSID_IoT, P>) and a new SID-list (e.g., <F_IoT>) starts being processed. DCI router 231 may steer the IP packet to be routed into P router 240 through firewall IoT 233 (see 233' SRv6 in FIG. 5). As such, in one embodiment of FIG. 5, DCI router 231 may expand each BSID into the SR policies of P1 and P2. This means that the SR policies are not produced in a core network domain but GiLAN domain may be involved with updating or configuring the SR policies by using BSID.

Figure 7:
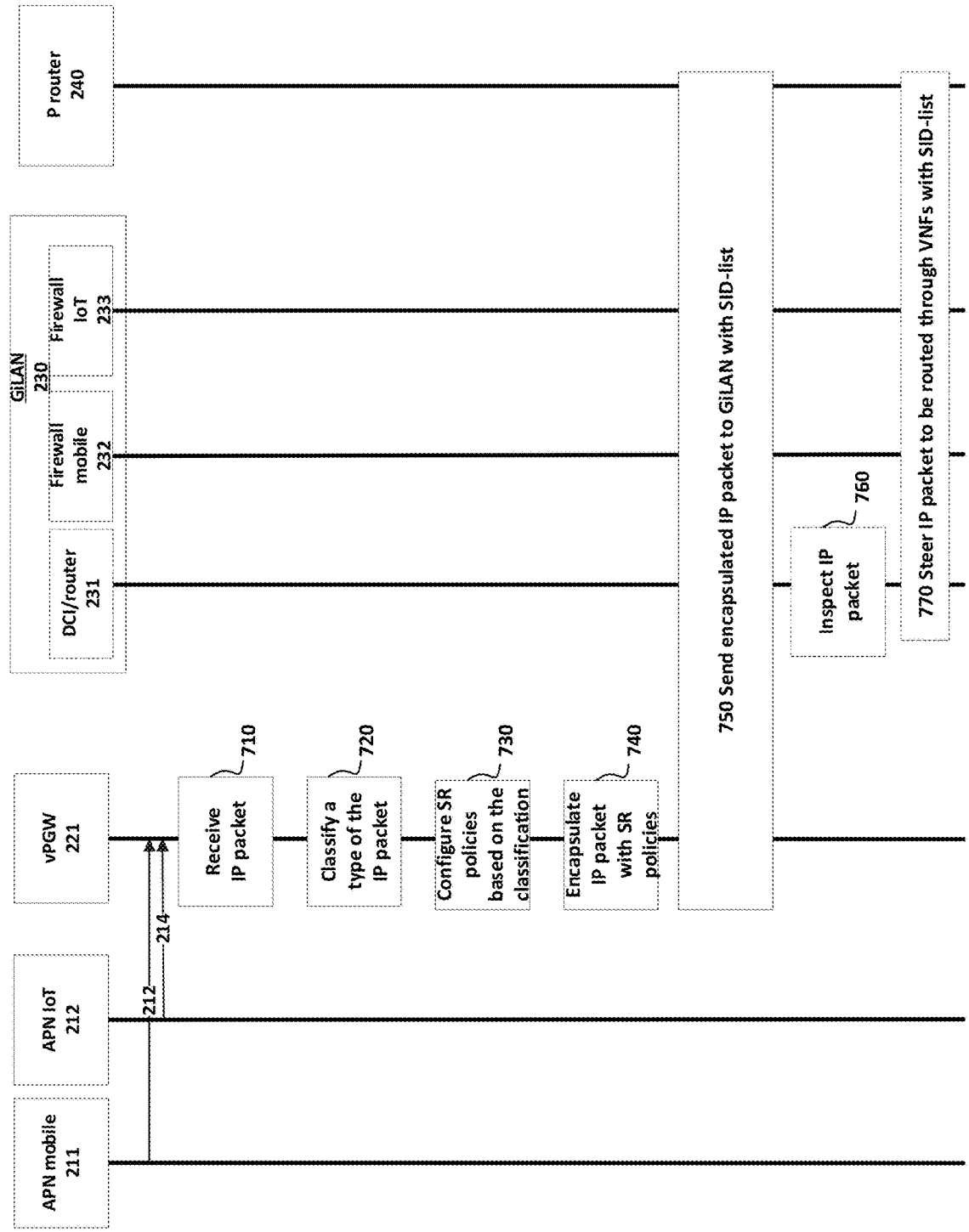
FIG. 7 illustrates an example of a flow chart of mobile packet core mechanism for GiLAN network slice with segment routing.

FIG. 7 illustrates an example of a signal flow chart of mobile packet core mechanism for GiLAN network slice with segment routing. FIG. 7 is reproduced in view of FIGS. 2 and 5 and presents the technical features of the mobile packet core mechanism that vPGW 221 and DCI router 231 perform SR policies in an in-band manner. In one embodiment, vPGW 221 may receive IP packet (i.e., GTP packet) from APN mobile 211 or APN IoT 212 via a GTP tunnel (Step 710). A type of the IP packet may be the mobile traffic 212 or the IoT traffic 214. vPGW 221 may classify a type of the traffic type for the IP packet based on the account information and determine that the IP packet is classified as the mobile traffic or the IoT traffic (Step 720). vPGW 221 may generate SR policies based on the classification of the IP packet. vPGW 221 may configure SID-list of SR policies for the IP packet to steer the IP packet to be routed through one or more virtual network functions (VNFs) within GiLAN domain (Step 730). The SID-list of SR policies may be differently configured depending on whether the IP packet is a type of the mobile traffic or the IoT traffic. vPGW 221 may encapsulate SR policies into SRH with the IP packet (Step 740) and send the encapsulated IP packet to network slices within GiLAN domain (Step 750). In another embodiment, DCI router 231 may be deployed in GiLAN 230 and steer the IP packet to be routed through VNFs within GiLAN domain. When vPGW 221 preconfigures SR policies and sends the IP packet encapsulated with the SR polices including binding SID (BSID), DCI router 231 may inspect BSID from the IP packet received from vPGW 221, and configure or update SR policies (Step 760). DCI router 231 may steer the IP packet to be routed through VNFs as configured in SID-list of the configured or updated SR policies (Step 770).

Figure 8:
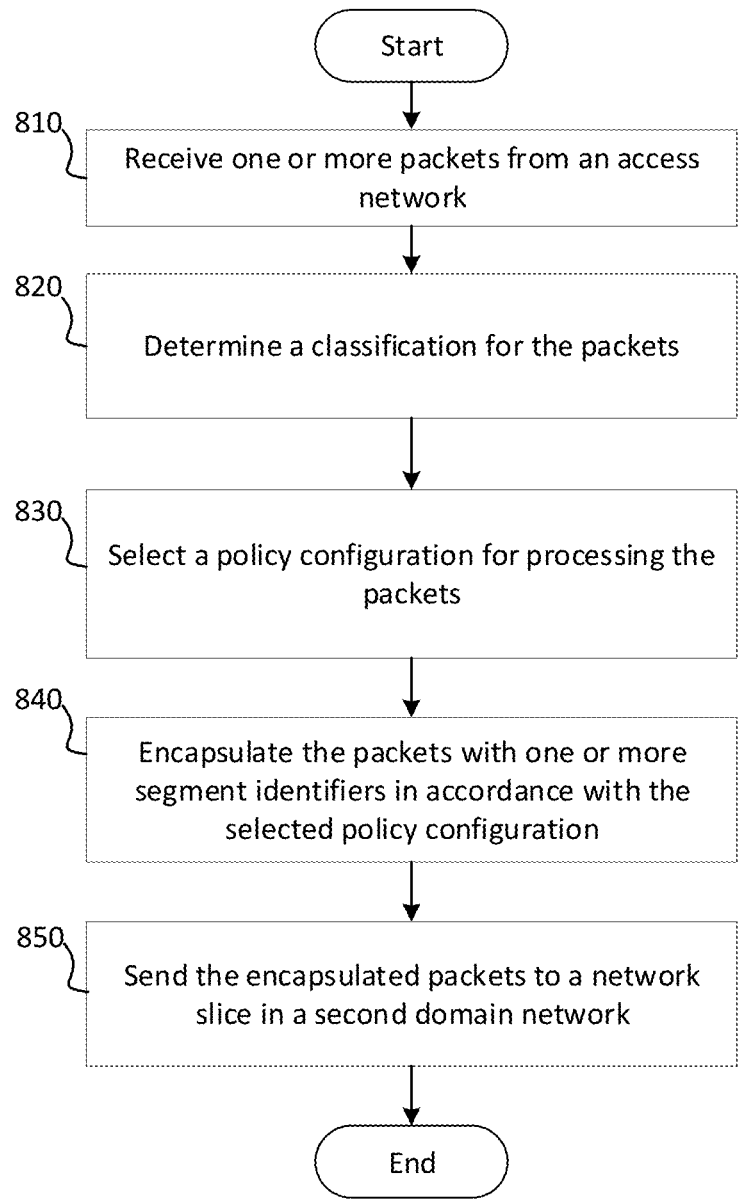
FIG. 8 illustrates an example of a simplified flow chart of mobile packet core mechanism for GiLAN network slice with segment routing.

FIG. 8 illustrates an example of a simplified flow chart of mobile packet core mechanism for GiLAN network slice with segment routing. The method may be performed by a network apparatus (e.g., vPGW 221 in FIGS. 2, 5 and 7) of a first domain network (e.g., a core network 220 in FIGS. 2 and 5). In one embodiment, the network apparatus may receive one or more packets from an access network, at step 810. Herein the packets include accounting information of the packets. At step 820, the network apparatus may determine a classification for the packets based on the accounting information. At step 830, the network apparatus may determine that the packets are processed with a first policy configuration (e.g., P1 SR policy) or a second policy configuration (e.g., P1 SR policy) based on the determined classification. That is, the policy configuration may be determined based on whether a type of the packets is a mobile traffic or an IoT traffic. At step 840, the network apparatus may encapsulate the packets with a first identifier (e.g., SID-list of P1 policy) of the first policy configuration or a second identifier (e.g., SID-list of P2 policy) of the second policy configuration based on the determining. At step 850, the network apparatus may send the encapsulated packets to a first network slice or a second network slice included in a second domain network (e.g., GiLAN network domain in FIGS. 2 and 5).

In particular embodiments, a network apparatus comprising one or more processors may include hardware, software, or both for identifying, classifying the IP packet, and communicating with access network and GiLAN. As an example and not by way of limitation, the network apparatus may include communication interface including, for example, a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface for it. As an example and not by way of limitation, a mobile network system including the network apparatus may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the mobile network system may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The mobile network system may include any suitable communication interface for any of these networks, where appropriate. The communication interface may include one or more communication interfaces, where appropriate. Although this disclosure describes and illustrates a particular communication interface, this disclosure contemplates any suitable communication interface.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a network apparatus of a mobile packet core network:
   receiving one or more packets from an access network through a tunnel;
   determining, based on an identifier associated with the tunnel, an Access Point Name (APN) to which the one or more packets belong to;
   selecting, based on the determined APN, a policy configuration from a plurality of policy configurations for processing the packets;
   encapsulating the packets with one or more segment identifiers in accordance with the selected policy configuration; and sending the encapsulated packets to a network slice at an ingress of a Packet Domain Network (PDN) based on the one or more segment identifiers.

2. The method of claim 1, further comprising:
encoding the segment identifiers; and
attaching the encoded segment identifiers to a header of the packets.

3. The method of claim 1, the sending the encapsulated packets to a network slice at an ingress of a Packet Domain Network (PDN) comprising:
sending, when the selected policy configuration is a first policy configuration and the packets are determined to be classified as a first type of traffic, the encapsulated packets to a first network slice at the ingress of the PDN; and
sending, when the selected policy configuration is a second policy configuration and the packets are determined to be classified as a second type of traffic, the encapsulated packets to a second network slice at the ingress of the PDN.

4. The method of claim 3, wherein:
the first type of traffic indicates the packets sent from a mobile device through the access network; and
the second type of traffic indicates the packets sent from a machine device through the access network.

5. The method of claim 1, wherein encapsulating the packets comprises:
determining a service function chain for the network slice based on the selected policy configuration;
identifying the segment identifiers each indicating corresponding different service function in the service function chain; and
attaching the identified segment identifiers to a header of the packets.

6. The method claim 5, wherein the service function chain indicates one or more service function nodes that:
deploy at the ingress of the PDN; and
are a path for sending the packets at the ingress of the PDN.

7. The method of claim 5, wherein the segment identifiers indicate locations of the corresponding service functions.

8. The method of claim 1, wherein a router at the ingress of the PDN performs:
receiving the packets including the segment identifiers;
inspecting the packets to identify a function indicating each of the segment identifiers; and
causing the router to change a service function chain associated with the network slice based on at least one of a network condition, preference, or network policy.

9. A network apparatus of a mobile packet core network, comprising:
one or more processors; and
one or more computer-readable non-transitory storage media coupled to the one or more processors and comprising instructions operable when executed by the one or more processors to cause the network apparatus to:
receive one or more packets from an access network through a tunnel;
determine, based on an identifier associated with the tunnel, an Access Point Name (APN) to which the one or more packets belong to;
select, based on the determined APN, a policy configuration from a plurality of policy configurations for processing the packets;
encapsulate the packets with one or more segment identifiers in accordance with the selected policy configuration; and
send the encapsulated packets to a network slice at an ingress of a Packet Domain Network (PDN) based on the one or more segment identifiers.

10. The network apparatus of claim 9, wherein the one or more processors are further operable when executing the instructions to:
encode the segment identifiers; and
attach the encoded segment identifiers to a header of the packets.

11. The network apparatus of claim 9, wherein in sending the encapsulated packets to a network slice at an ingress of a Packet Domain Network (PDN), the one or more processors are further operable when executing the instructions to:
send, when the selected policy configuration is a first policy configuration and the packets are determined to be classified as a first type of traffic, the encapsulated packets to a first network slice at the ingress of the PDN; and
send, when the selected policy configuration is a second policy configuration and the packets are determined to be classified as a second type of traffic, the encapsulated packets to the second network slice at the ingress of the PDN.

12. The network apparatus of claim 11, wherein:
the first type of traffic indicates the packets sent from a mobile device through the access network; and
the second type of traffic indicates the packets sent from a machine device through the access network.

13. The network apparatus of claim 9, wherein encapsulating the packets comprises:
determining a service function chain for the network slice based on the selected policy configuration;
identifying the segment identifiers each indicating corresponding different service function in the service function chain; and
attaching the identified segment identifiers to a header of the packets.

14. The network apparatus of claim 13, wherein the service function chain indicates one or more service function nodes that:
deploy at the ingress of the PDN; and
are a path for sending the packets at the ingress of the PDN.

15. The network apparatus of claim 13, wherein the segment identifiers indicate locations of the corresponding service functions.

16. The network apparatus of claim 9, wherein a router at the ingress of the PDN performs:
receiving the packets including the segment identifiers;
inspecting the packets to identify a function indicating each of the segment identifiers; and
causing the router to change a service function chain associated with the network slice based on at least one of a network condition, preference, or network policy.

17. One or more computer-readable non-transitory storage media embodying software that is operable on a network apparatus of a mobile packet core network when executed to:
receive one or more packets from an access network through a tunnel;
determine, based on an identifier associated with the tunnel, an Access Point Name (APN) to which the one or more packets belong to;

select, based on the determined APN, a policy configuration from a plurality of policy configurations for processing the packets;

encapsulate the packets with one or more segment identifiers in accordance with the selected policy configuration; and send the encapsulated packets to a network slice at an ingress of a Packet Domain Network (PDN) based on the one or more segment identifiers.

18. The one or more computer-readable non-transitory storage media of claim 17, wherein in sending the encapsulated packets to a network slice at an ingress of a Packet Domain Network (PDN), the software is further operable when executed to:

send, when the selected policy configuration is a first policy configuration and the packets are determined to be classified as a first type of traffic, the encapsulated packets to a first network slice at the ingress of the PDN; and send, when the selected policy configuration is a second policy configuration and the packets are determined to be classified as a second type of traffic, the encapsulated packets to a second network slice at the ingress of the PDN.

19. The one or more computer-readable non-transitory storage media of claim 17, wherein encapsulating the packets comprises:

determining a service function chain for the network slice based on the selected policy configuration;

identifying the segment identifiers each indicating corresponding different service function in the service function chain; and attaching the identified segment identifiers to a header of the packets.

20. The one or more computer-readable non-transitory storage media of claim 17, wherein a router at the ingress of the PDN performs:

receiving the packets including the segment identifier;

inspecting the packets to identify a function indicating each of the segment identifiers; and causing the router to change a service function chain associated with the network slice based on at least one of a network condition, preference, or network policy.

* * * * *